US012576771B2

(12) United States Patent
Wilson

(10) Patent No.: US 12,576,771 B2
(45) Date of Patent: Mar. 17, 2026

(54) DYNAMIC BOAT TRAILER GUIDE

(71) Applicant: Paul Arthur Wilson, Dixon, IL (US)

(72) Inventor: Paul Arthur Wilson, Dixon, IL (US)

( * ) Notice: Subject to any disclaimer, the term of this patent is extended or adjusted under 35 U.S.C. 154(b) by 849 days.

(21) Appl. No.: 17/850,923

(22) Filed: Jun. 27, 2022

(65) Prior Publication Data

US 2023/0415631 A1     Dec. 28, 2023

(51) Int. Cl.
B60P 3/10          (2006.01)

(52) U.S. Cl.
CPC .................................. B60P 3/1075 (2013.01)

(58) Field of Classification Search
CPC .............................. B60P 3/1066; B60P 3/1075
USPC ....................................................... 280/414.1
See application file for complete search history.

(56) References Cited

U.S. PATENT DOCUMENTS

| | | | | |
|---|---|---|---|---|
| 2,972,325 | A | * | 2/1961 | Beltmann ............... B63B 34/67 |
| | | | | 242/157 R |
| 4,010,962 | A | * | 3/1977 | Groblebe .............. B60P 3/1075 |
| | | | | 414/529 |
| 5,360,226 | A | * | 11/1994 | Gussler, Jr. ........... B60P 3/1075 |
| | | | | 280/414.1 |

FOREIGN PATENT DOCUMENTS

AU          2013100979 A4 *  8/2013

* cited by examiner

*Primary Examiner* — Valentin Neacsu
*Assistant Examiner* — Felicia L. Brittman-Alabi

(57)                ABSTRACT

Such a guide control assembly apparatus may have the ability to improve the process of loading a boat onto a boat trailer while in the water. The guide control assembly apparatus may guide and hold the boat over the desired position on the boat trailer. The ability to instantly react to different conditions encountered when loading a boat on a trailer and the ability to control the mechanical variables of a typical tall guide roller pole or equivalent and allow the operator to easily the adjust how these mechanical variables are controlled, makes this invention a substantial non-obvious improvement over what is currently utilized and previous art.

5 Claims, 4 Drawing Sheets

DYNAMIC BOAT TRAILER GUIDE

CROSS-REFERENCE TO RELATED APPLICATIONS

This application is related to the following listed application (the Related Applications). All subject matter of the Related Applications and of any and parent and grand parent, etc. applications of the Related Application is incorporated herein by reference in its entirety and to the extent such subject matter is not inconsistent herein.

This application is related to, and claims priority to, U.S. Provisional Patent Application Ser. No. 63/218,473, entitled DYNAMIC BOAT TRAILER GUIDE, naming Paul Arthur Wilson as the inventor, filed Jul. 5, 2021.

FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

This invention generally relates to a guide configured to aid in the loading of a boat onto a boat trailer while in the water. This invention called the Dynamic Boat Trailer Guide may be added to most commercially available boat trailers. The invention is intended to make loading a boat in the water onto a boat trailer easier and safer. It may help guide a boat onto the boat trailer and may hold the boat in the proper position for securing and removing said boat from the water.

There are hundreds of thousands of small boats in the United States alone. Most of them are not kept on the water but transported and stored on boat trailers at boat owner's homes or other storage locations. Removing the boat from the water and placing it on a boat trailer is usually performed at designated public boat ramps. These ramps consist of a hard surfaced roadway sloping at a downward angle and continuing into and under the water. Usually there is a dock (walkway) extending into and above the water directly next to the ramp. The dock allows for a place to temporarily secure the boat until the boat trailer is in place.

Once the boat is secured to the dock, the boat trailer is backed down the ramp until it is completely submerged. Once the boat trailer is submerged, the boat must be unsecured from the dock and guided accurately over the boat trailer to ensure proper positioning on the boat trailer once removed from the water. Obtaining and holding this position is the most difficult part of removing the boat from the water. A floating boat may slide in any direction on top of the water. The direction the boat moves may be affected by wind and/or current.

In order to guide the boat on to the boat trailer some operators use lines (ropes) leading to the dock they are standing on next to the boat trailer. The force being applied to the line may move the boat forward but because the boat slides on the water will also pull the boat laterally toward the dock and moving it away from the boat trailer. Some boat operators attempt to drive the boat using the boat's motor power onto the boat trailer. The boat may still be affected by the wind and current, plus a boat steers from the stern (back).

There is no direct control over the bow (front). To have adequate steerage a boat may require a fair amount of forward motion. This forward motion may equate to a substantial amount of momentum for even a small boat. Any error and the boat could impact the boat trailer or dock resulting in damage to any of the three. A third method employed by some boat operators is to walk out into the water along the centerline of the boat trailer and then attempt to pull or fasten a winch line to the front of the boat. The boat is still affected by the lateral forces of wind and current. Most importantly, it is very dangerous to the boat operator to enter the water. Ramp surfaces under the water may be slippery from aquatic growth and it is easy for a boat operator to slip and go under the trailer and be trapped under water.

To help counteract the boat slipping over the water in an undesired direction, some type of guide located on the boat trailer needs to be in place enabling the boat operator to properly guide and hold the boat over the boat trailer. There are rollers available that can be mounted low on the undercarriage of the boat trailer, but normally they are submerged and may not be visible to the boat operator to guide the boat onto the boat trailer. At times the water at the ramp may be too deep and these types of rollers cannot contact the bottom of the boat and thus offer no help during the loading process. There are also tall static rigid guide poles available that protrude above the water and are permanently mounted to both sides of the rear of the boat trailer. While more visible than submerged devices they have several flaws. First, they may not adequately hold the boat in the proper place on the boat trailer. Many boats are flared (wider) in the bow (front) of the boat than in the stern (back) of the boat. The distance between the tall static rigid guide poles must be set for the widest part of the boat so it can pass between them. In some boats there is a substantial difference in width from front to back. The boat, at its narrowest part, may not be held in the proper position laterally on the boat trailer. Second, these tall static rigid guide poles offer no impact absorption for boats being loaded under power. It is not uncommon to observe these tall static rigid guide poles bent from previous impacts from the boat.

BRIEF SUMMARY OF THE INVENTION

This invention, the Dynamic Boat Trailer Guide, is a substantial improvement over all the tall static rigid guides poles and low roller guides available. The invention is intended to be installed in pairs with a minimum of one on each side of a boat trailer. The invention consists of a tall guide pole with a roller that can pivot and is spring loaded. The tall guide pole projects above the water to enable the operator to determine where a submerged trailer is in murky (dirty) and/or deeper water. The tall guide pole is also intended to remain in contact with the rub-rail (protective edge attached to a boat) on a fiberglass boat or the gunnels (top lip) on a metal boat throughout the loading process.

Unlike existing tall static rigid guide poles, the ability to pivot laterally from the axis of the boat trailer and the spring action allows the invention to automatically adjust for the varying width of some boats as they pass the said invention. The invention may also hold the boat over the boat trailer in the proper position by constantly counteracting outside forces acting on the boat's direction of movement.

Another improvement over existing tall static rigid guide poles is the invention has a tall guide pole that is spring loaded and may provide some impact energy absorption for boats being loaded under power. The spring preload is adjustable and springs may be exchanged for ones with different characteristics to improve the overall performance of the invention.

The invention may take the place of a helper and may securely hold the boat in the proper position. It may make it less likely an operator will enter the water to reposition the boat. This invention makes the whole process of loading a boat on a trailer easier and as a result safer. It is a substantial improvement over low roller guides and tall static rigid guide poles currently available.

DETAILED DESCRIPTION OF THE INVENTION

Figure 1:
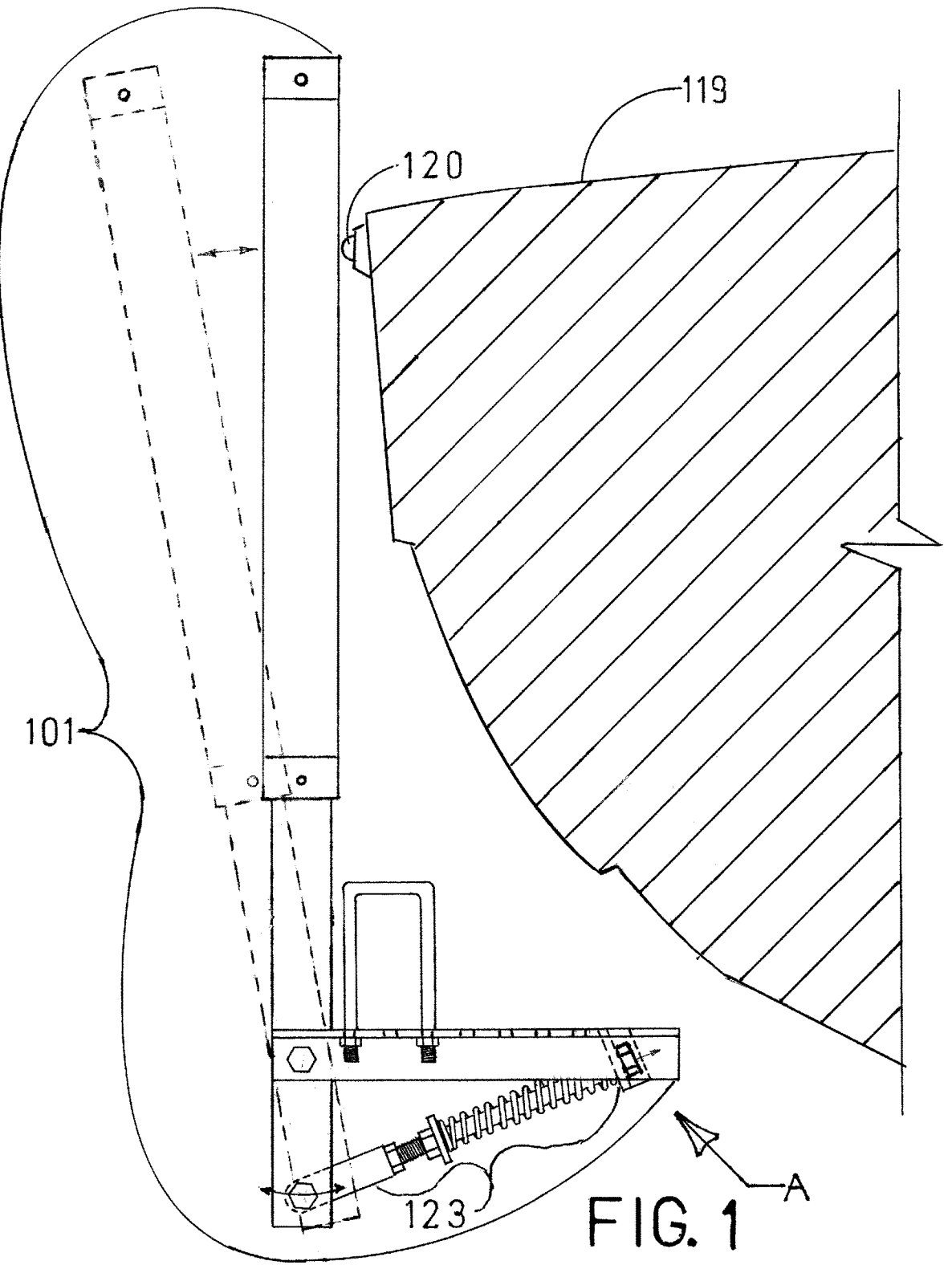
FIG. 1 Is a perspective view of the invention interacting with a sectional view of a boat.
Figure 2:
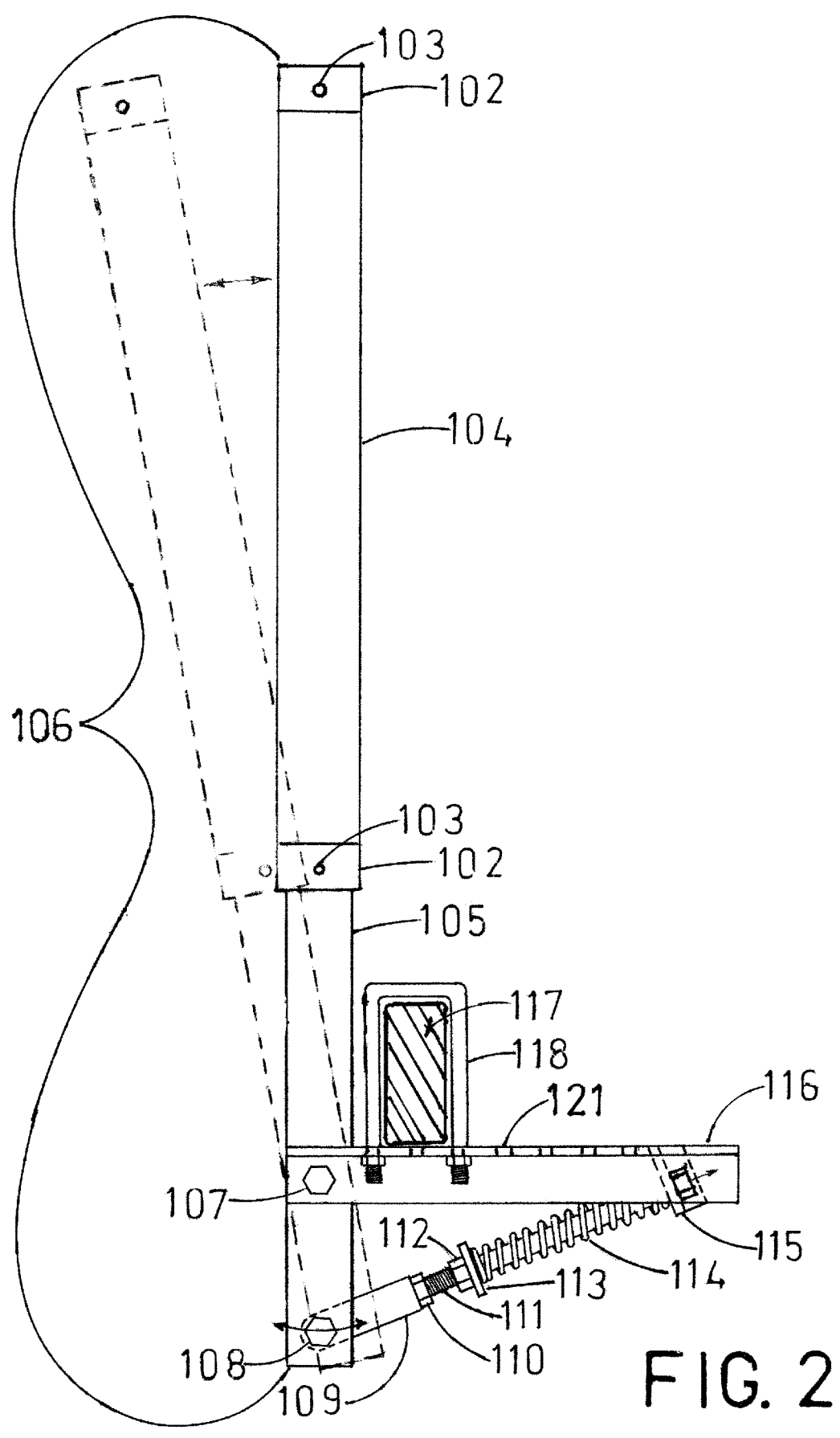
FIG. 2 Is a perspective view of the invention mounted to a sectional view of a boat trailer frame showing the various components of the invention.
Figure 3:
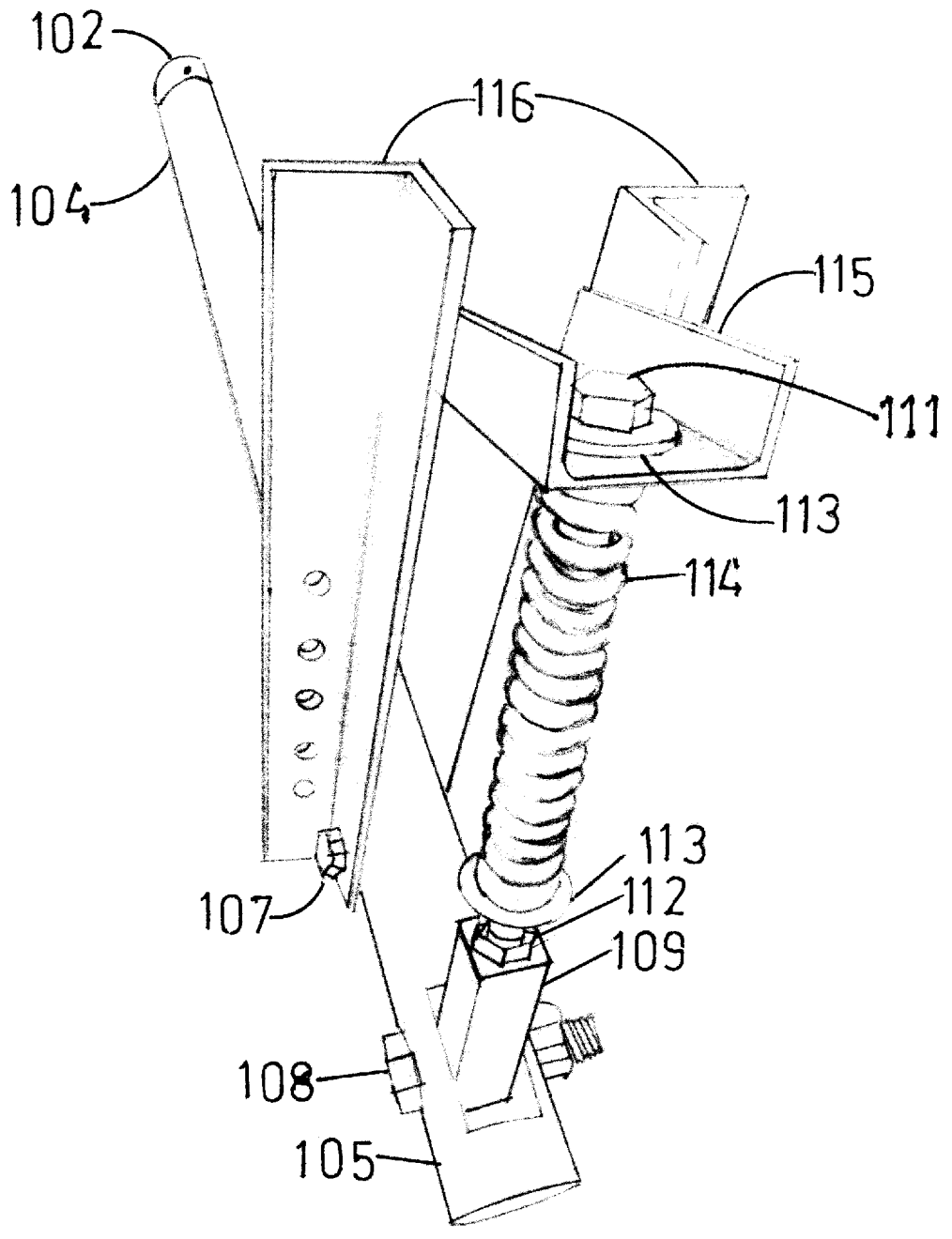
FIG. 3 Is a three dimensional representation of the invention as seen from view A in FIG. 1 looking somewhat up from the bottom.
Figure 4:
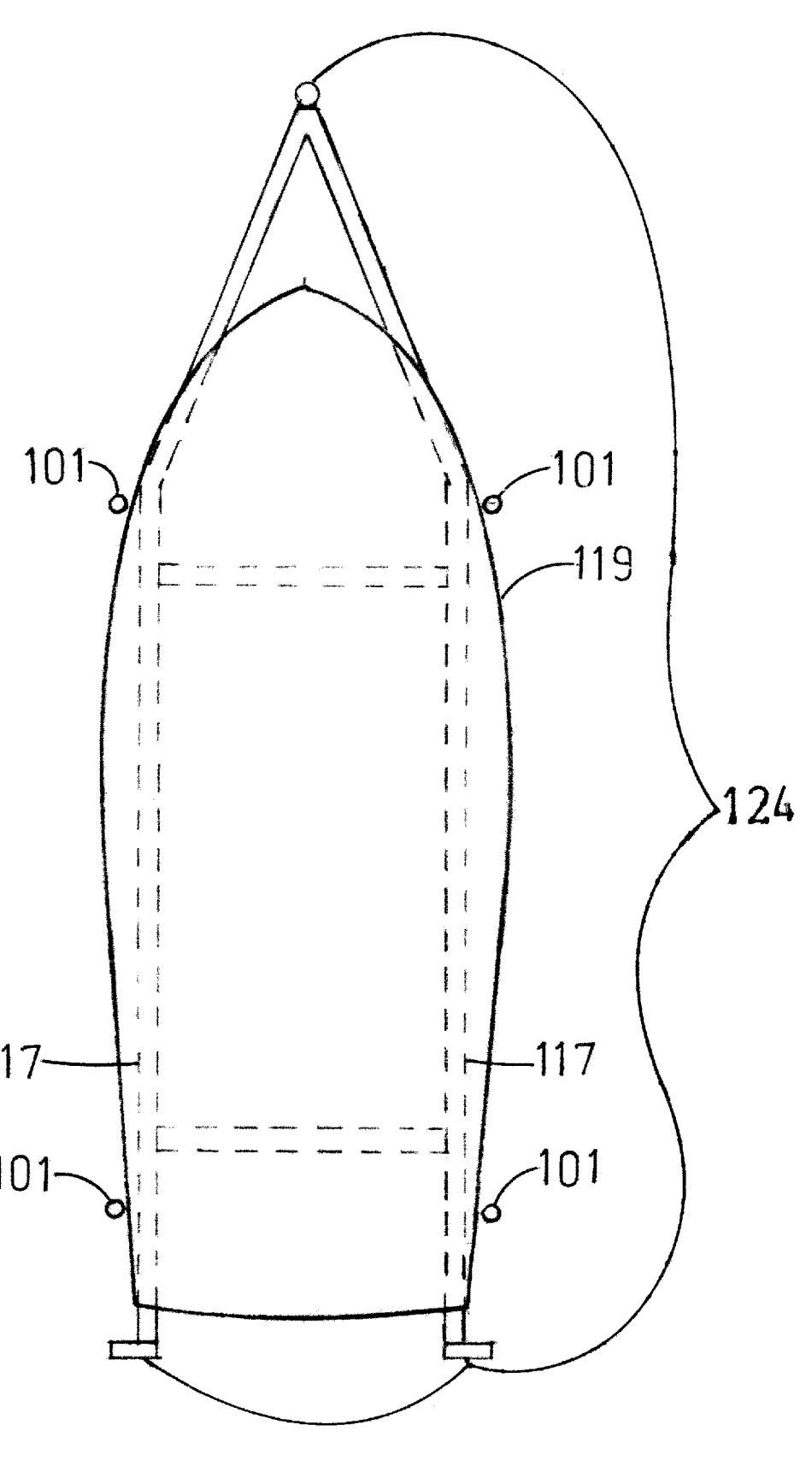
FIG. 4 Is an overhead view looking down on a boat loaded on a boat trailer showing possible mounting locations for the invention.

Reference FIGS. 1, 2, 3, and 4

This invention (101) consists of a tall, spring-loaded, pivoting, guide pole and mounting hardware.

The tall guide pole (106) consists of a rigid pole (105) surrounded by a plastic sleeve (104) which may rotate freely around the rigid pole (105). The rigid pole (105) may be constructed of but not limited to heavy steel tubing. The plastic sleeve (104) is held in place on both ends by a plastic bearing (102) fastened to the rigid pole (105) by way of any appropriate fastener such as a bolt (103). The composition of the plastic sleeve (104) is such that it slides easily on the rigid pole (105) and provides some level of protection from damage to paint and/or fiberglass used in the construction of small boats.

The tall guide pole (106) is loosely captured between two brackets (116) by way of a bolt (107) passing through the rigid pole (105) and the brackets (116). These brackets (116) as shown may be constructed of, but not limited to, heavy angle iron or other suitable material and configurations that would perform the same function. The bolt (107) forms a fulcrum and pivot point that allows the tall guide pole (106) to pivot around the bolt (107). The brackets (116) have multiple holes (121) in the top and running along the length. These holes (121) provide for fastening the brackets to a boat trailer frame (117) utilizing u-bolts (118) as shown or other fasteners as appropriate. The provision of multiple holes (121) may allow for adjusting the position of the invention (101) on the boat trailer frame (117). The multiple holes may also allow for mounting the invention (101) on boat trailer frames (117) of different sizes by providing U-bolts (118) or other fasteners of an appropriate size for that frame.

Below the guide pole pivot bolt (107) there is a spring-loaded pushrod assembly (123) captured loosely inside the rigid pole (105) by a pivot bolt (108) passing through the rigid pole (105) and pushrod end (109). The pushrod assembly (123) consists of a pushrod end (109) drilled and tapped to receive the threads of a long guide bolt (111), a jam nut (110), a compression spring adjusting nut (112) which is self locking, a washer (113), and compression spring (114). The push rod assembly (123) is constructed of metal or other materials suitable for the purpose intended. The long guide bolt (111) is threaded on one end to couple with the pushrod end (109) and has a fixed head on the opposite end. The long guide bolt (111), is captured loosely through a hole in an end piece (115) welded between the brackets (116). The hole in the end piece (115) is of the size to allow the shank of the long guide bolt (111) to pass freely through, but not the fixed head. The long guide bolt (111) may move through the end piece (115) in the direction away from the tall guide pole (106) until the compression spring (114) reaches complete compression. Movement of the long guide bolt (111) in the direction toward the tall guide pole (106) is limited by the fixed head of the long guide bolt (111) contacting the end piece (115). The long guide bolt (111) serves to control the length and transmission of force within the pushrod assembly (123). The compression spring (114) is captured on the long guide bolt (111) between the compression spring adjusting nut (112) with washer (113) and the end piece (115). The compression spring (114) supplies the resistance to rotational movement of the tall guide pole (106).

Detailed Operation of the Invention

Typical Loading Procedure Overview:

Reference FIGS. 1, 2, 3, and 4

Assume the trailer and boat are both in the water as described previously in the Back Round of The Invention section. The typical procedure to load a floating boat (119) onto a submerged boat trailer (124) begins by positioning the boat (119) somewhat centered behind and facing the same direction as the trailer (124). The boat (119) is moved forward until it is centered and in the proper position over any boat supports that may be integral to the boat trailer (124). The bow (front) of the boat (119) may be secured to the boat trailer (124) by various means. The boat trailer (124) and the boat (119) are pulled forward up the ramp and out of the water by a suitable tow vehicle. Once on land the full weight of the boat (119) rests on the boat trailer (124), and it becomes very difficult to reposition the boat (119) on the boat trailer (124) if necessary. Usually there are a number of other boat operators waiting to load their boats, so the opportunity to refloat the boat for repositioning may be limited. Many times the boat operator is "single-handed" and has no help to load the boat (119). Therefore, it is essential the boat (119) be guided onto and be held in the proper position over the boat trailer (124), while both are still in the water. This is the primary purpose of this invention.

Installation and Adjustment of Invention on a Boat Trailer:

Reference FIGS. 1, 2, 3, and 4

The invention (101) is intended to be installed in pairs on most commercially available boat trailers (124). When one pair is utilized, they typically will be installed toward the rear of the boat trailer (124). One invention (101) will be attached to the boat trailer frame (117), on each opposing side, directly across from and facing each other, relative to the centerline of the boat trailer (124). When two sets are utilized the second set may be installed anywhere on the boat trailer (124) ahead of the first set in a similar fashion.

The tall guide pole (106) is designed to remain in contact with the boat (119) at all times during and after loading. When properly installed, the distance, lateral to the boat trailer (124), between any one pair of tall guide poles (106), should be less than or equal to the narrowest lateral dimension of the boat (119) that may pass thru them. This may be accomplished by utilizing the various holes (121) in the mounting brackets (116) to adjust the invention (101) toward or away from the centerline of the boat trailer (124), as required. The amount of holding force imparted to the boat (119) when in place over the boat trailer (124) may be adjusted by changing the preload on the compression spring (114) of the pushrod assembly (123). This is accomplished by turning the compression spring adjusting nut (112) on the long guide bolt (111). Turning the compression spring adjusting nut (112) in a direction that shortens the compression spring (114) increases the holding force of the tall guide pole (106). Turning the compression spring adjusting nut (112) in the opposite direction reduces the force. The initial angle of the guide pole (106) in relation to the trailer frame (117) may be adjusted by changing the length of the pushrod assembly (123). This is accomplished by loosening the jam nut (110) and turning the long guide bolt (111) one way or the other and retightening the jam nut (110) when finished. Operation During Typical Loading Procedure:

Reference FIGS. 1, 2, 3, and 4

Assume the loading procedure is beginning. There is one invention (101) installed on each side of the boat trailer (124), directly across from each other, on opposing sides, near the rear of a boat trailer (124). The tall guide poles (106) are being held in the near vertical position by the pushrod assemblies (123). The boat (119) is moved forward over the rear of the trailer, the rub-rail (120) on the narrower portion of the bow (front of the boat) contacts the guide poles (106) on both sides of the boat trailer (124). As the boat (119) continues to move forward, the plastic sleeve (104) rotates on the rigid pole (105) acting as a roller to reduce the friction between the rigid pole (105) and the boat's (119) rub-rail (120) during the movement relative to each other.

The boat (119) initially may increase in width as it moves forward and requires the lateral distance between the tall guide poles (106) to also increase. The boat (119) imparts an outward force to the tall guide poles (106) laterally away from the centerline of the boat trailer (124). This outward force is mechanically multiplied across the fulcrum pivot bolt (107) and in turn displaces the bottom) end of the tall guide pole (106) toward the centerline of the boat trailer (124). A vector component of the multiplied force on the bottom end of the tall guide pole (106) is transferred through the pushrod pivot bolt (108) into the pushrod end (109). The pushrod end (109) then transfers the force into the long guide bolt (111) along the axis of the pushrod assembly (123). The long guide bolt (111) is displaced toward the center line of the boat trailer (124) through the hole in the end piece (115). The compression spring (114) is captured on the long guide bolt (111) between the compression spring adjusting nut (112) with washer (113) and the end piece (115). When the long guide bolt (111) is displaced through the end piece (115) the compression spring (114) is compressed between the compression spring adjusting nut (112) with washer (113) and the end piece (115). The compressed compression spring (114) stores the energy from the vector component force along the axis of the pushrod assembly (123).

When the boat (119) continues to move forward, it may once again, become narrower in width. The tall guide pole (106) under compression from the pushrod assembly (123) moves toward the centerline of the boat (119). This allows the compression spring (114) to release some of its stored potential energy by moving the long guide bolt (111) back through the end piece (115). The guide pole (106) below the fulcrum bolt (107) is then displaced away from the centerline of the boat trailer (124) forcing the guide pole above the fulcrum back against the boat (119), keeping the boat (119) centered over the boat trailer (124). It is assumed all compression springs (114) are identical and are preloaded the same amount on opposing tall guide poles (106). Through this interaction of components in the pushrod assembly (123) and the tall guide pole (106), the tall guide pole (106), is forced to remain in contact with boat (119) and control the position and movement of the boat (119).

Operation During Environmental Factors:

Reference FIGS. 1, 2, 3, and 4

Environmental factors may affect the "typical loading procedure" described in the previous section. The characteristics of water are such that a floating boat (119) will slide over the water in any direction. Pulling a boat (119) forward with a rope from a parallel adjacent dock (walkway) will tend to move the boat (119) at an angle due to the component vectors of force acting along the rope. Wind and/or water currents may push the boat (119) in an undesired direction. When any combination of these environmental factors forces the boat (119) against a tall guide pole (106), a component of the force tries to displace the tall guide pole (106) laterally. Resistance to movement of the tall guide pole (106) is supplied to the tall guide pole (106) by the pushrod assembly (123). The size and the preload of the compression spring (114) are intended to be such that most environmental forces cannot overcome the resistance to lateral movement supplied by the compression spring (114). The tall guide pole (106) imparts a force back to the boat (119) causing it to move back into position. If the environmental factors in the area the boat (119) is operated in, become large enough to hamper proper boat trailer (124) loading, the preload of the compression spring (114) may be increased as outlined in the "installation and adjustment of the invention section" above. In extreme conditions, a compression spring (114) with a higher spring rate may be utilized.

Operation During an Impact:

Reference FIGS. 1, 2, 3, and 4

Some boat operators choose to move the boat (119) forward onto the boat trailer (124) under power from the boat's motor. Unlike automobiles, boats steer from the stern (back). The environmental factors mentioned above are still a concern since the bow (front) of the boat (119) is not being directly controlled by the boat operator. It may be difficult to perfectly align the front of the boat (119) moving forward in this manner. The possibility of operator error and impacting the tall guide pole (106) become greater. A moving boat (119) can store a large amount of energy in the form of momentum. If a currently available tall static rigid type guide pole is struck with too much force, damage can occur as a result of this momentum. The invention (101) may mitigate damage to the tall guide pole (106) or boat (119), since the tall guide pole (106) has the ability to pivot on the fulcrum bolt (107) and store excess energy in the compression spring (114). As described above under the section, "Operation during typical loading procedure", the guide pole (105) may move multiple inches laterally away from the centerline of the trailer. The boat (119) is decelerated over this distance as the compression spring (114) stores more and more energy until it reaches its minimum compression length, at which point, the guide pole (106) can no longer move, abruptly stopping the boat (119). Depending on the velocity of the boat (119), enough energy may be absorbed to prevent or at least minimize any damage resulting from the impact.

CONCLUSION

Different features and variations of the invention have been presented in this disclosure. What has been demonstrated in this disclosure as to construction of or different configurations of, the invention (101), is for illustrative purposes to explain the concept of this invention and does not try to represent every possible embodiment. Anyone skilled in the art could conceive of variations and modifications that are intended to be covered by what has been presented in this disclosure.

It is the intent of this disclosure that all variations, embodiments, and modifications of this invention be protected by the patent requested and that the scope be determined by proper legal interpretation, from those skilled in the art.

What is claimed:

1. A boat loading guide control assembly apparatus, comprising:
   a tall guide pole;
   a pushrod assembly;
   a bracket arrangement configured to engage a boat trailer frame;
   wherein said pushrod assembly includes:
      a pushrod end;
      a jam nut;
      a long guide bolt;
      a compression spring adjusting nut;

a washer;
a compression spring;
wherein the long guide bolt includes:
   a threaded portion, configured to allow for adjustment of a length of the pushrod assembly and an adjustment of preload on the compression spring;
   wherein the threaded portion comprises a first end and a second end opposite the first end, the first end extends through the jam nut and into the pushrod end, the second end extends into the compression spring adjusting nut, into the washer, into the compression spring, and finally into a hole in the bracket arrangement; and
   wherein the compression spring adjusting nut includes:
      a nut configured to turn on the long guide bolt to change a length of the compression spring to change the preload on the compression spring.

2. The boat loading guide control assembly apparatus of claim 1, wherein said pushrod end includes:
   a female threaded portion configured to allow for adjustment of the length of the pushrod assembly; and
   a hole configured for connection to a pivot point.

3. The boat loading guide control assembly apparatus of claim 1, wherein said jam nut includes:
   a nut on the said long guide bolt configured to engage said pushrod end to prevent the long guide bolt from turning within said push rod end.

4. The boat loading guide control assembly apparatus of claim 1, wherein said washer includes:
   a washer configured to act as an interface between said compression spring adjusting nut and said compression spring.

5. The boat loading guide control assembly apparatus of claim 1, wherein said compression spring includes:
   a coil spring configured to be exchanged with springs having different physical characteristics based on a desired performance of the guide apparatus.

* * * * *